US006289585B1

(12) United States Patent
Staruszkiewicz

(10) Patent No.: US 6,289,585 B1
(45) Date of Patent: Sep. 18, 2001

(54) METHOD OF ATTACHING PIPES

(76) Inventor: Adrian Staruszkiewicz, 1170 Needlewood Loop, Oviedo, FL (US) 32765

(\*) Notice: Subject to any disclaimer, the term of this patent is extended or adjusted under 35 U.S.C. 154(b) by 0 days.

(21) Appl. No.: 09/522,558

(22) Filed: Mar. 10, 2000

(51) Int. Cl.[7] ............................. B21D 51/38; B23P 15/26
(52) U.S. Cl. ......................... 29/890.052; 29/890.043; 29/890.054; 165/173
(58) Field of Search ..................... 29/890.043, 890.052, 29/890.054; 165/67, 173

(56) References Cited

U.S. PATENT DOCUMENTS

| 3,689,972 | 9/1972 | Mosier et al. . |
|---|---|---|
| 4,546,825 | 10/1985 | Melnyk et al. . |
| 4,619,292 * | 10/1986 | Harwood ............................. 138/113 |
| 5,036,914 * | 8/1991 | Nishishita et al. .................... 165/173 |
| 5,052,480 * | 10/1991 | Nakajima et al. .................... 165/173 |
| 5,067,235 | 11/1991 | Kato et al. . |
| 5,119,552 | 6/1992 | Sutou et al. . |
| 5,125,454 * | 6/1992 | Creamer et al. ..................... 165/173 |
| 5,127,466 * | 7/1992 | Ando ..................................... 165/67 |
| 5,205,349 * | 4/1993 | Nagao et al. .......................... 165/67 |
| 5,329,995 * | 7/1994 | Dey et al. ............................. 165/173 |
| 5,341,872 * | 8/1994 | Mercurio ............................... 165/173 |
| 5,343,620 | 9/1994 | Velluet . |
| 5,407,004 | 4/1995 | DeRisi et al. . |
| 5,570,737 * | 11/1996 | Tokutake ................................ 165/67 |
| 5,582,239 | 12/1996 | Tsunoda et al. . |
| 5,607,012 * | 3/1997 | Buchanan et al. .................... 165/173 |
| 5,944,096 * | 8/1999 | Hubert .................................. 165/173 |

\* cited by examiner

*Primary Examiner*—S. Thomas Hughes
*Assistant Examiner*—Marc Jimenez
(74) *Attorney, Agent, or Firm*—Paul S. Rooy

(57) ABSTRACT

A method of attaching pipes. A header pipe is divided into two longitudinally. Header bores are made into one header part, tubes are inserted into each header bore, and the tubes are attached to the header part. One method of attachment is via automatic welding from the inside of the header part. Both welding and inspection are much facilitated by means of the instant method. After the tube(s) have been attached to the header, the attachments are inspected both from the inside and the outside of the header part, and finally the two header parts are re-attached, and their re-attachment is inspected.

11 Claims, 4 Drawing Sheets

METHOD OF ATTACHING PIPES

BACKGROUND OF THE INVENTION

1. Field of the Invention

This invention relates to pipe structures, and in particular to a method of attaching pipes.

2. Background of the Invention

Myriad useful structures currently in use require the mutual attachment of pipes. In the area of environmental control alone examples include radiator tubes attached to header pipes, air conditioning coils, and heat exchanger coils. In the area of power generation, one application where a plurality of tubes must be attached to header pipes is in Heat Recovery Steam Generators ("HRSG"). A typical HRSG is illustrated in FIG. 1.

Referring now to FIG. 1, HRSG 2 comprises a plurality of finned tubes 6 (in the interest of clarity, the individual fins are not shown), each attached at one end to first header 4, and an opposite end to second header 5. An interior of first header 4 communicates with an interior of second header 5 by means of finned tubes 6. An exterior of finned tubes 6 is surrounded by a heating medium.

In use, water enters first header 4 as indicated by arrows 8. The water then travels to second header 5 by means of finned tubes 6. While transiting finned tubes 6 the water is heated, and exits second header 5 as steam, as indicated by arrow 10.

EXISTING METHODS

An existing method of attachment of two pipes is illustrated in FIG. 2. For the purposes of this illustration, the attachment of a finned tube 6 to second header 5 is illustrated. First a bore 12 is drilled into second header 5 sized to admit finned tube 6. Then weld prep 14 is machined into hole 12. One extreme of finned tube 6 is then inserted into hole 12, and weld 16 is made at the intersection of finned tube 6 and weld prep 14. Finally, weld 16 is inspected.

A number of problems exist associated with this existing method of attaching finned tubes 6 to second header 5. One problem is that automatic welding cannot be employed, because of interference with finned tubes 6 adjacent to the finned tube 6 being welded. The conventional method described above permits a worker to perform only approximately thirty four (34) welds every twelve hours. Given that automatic welding permits five (5) or more welds to be made simultaneously, a substantial time penalty is incurred by using manual welding, as opposed to the automatic welding as taught by the instant method.

Another problem is the lack of 100% penetration achievable using the current manual welding technique. If automatic welding were performed, power could be programmed to vary automatically with weld prep depth, in order to achieve 100% weld penetration.

Still another problem associated with the current weld method illustrated in FIG. 2 is the difficulty inherent in welding closely spaced finned tubes 6 to a header. In the application discussed above, finned tubes 6 are typically only 5–6 inches apart. Naturally, this causes clearance problems between the welder's torch and the finned tubes 6 adjacent the finned tube 6 being welded.

Yet another problem associated with the current method is the difficulty of performing a thorough inspection: only the exterior of the header may be inspected. Thus, deficiencies that may be visible from the inside of the header pass undetected.

SUMMARY OF THE INVENTION

Accordingly, it is an object of the present invention to provide a method of attaching pipes which permits automatic welding to be employed in pipe to pipe attachments. Design steps allowing this object to be accomplished include longitudinally dividing a header into two parts, making header bores into one header part, inserting a tube into each header bore, and automatically welding each tube into its respective header bore from the inside of the header part by means of automatic welding. Advantages associated with the accomplishment of this object is time savings, and consequent cost savings.

It is another object of the present invention to provide a method of attaching pipes which permits both inside and outside inspection of a pipe to pipe attachments. Design steps allowing this object to be accomplished include longitudinally dividing a header into two parts, making header bores into one header part, inserting a tube into each header bore, and attaching each tube to the header part. Benefits associated with the accomplishment of this object include a more thorough inspection, and less sub-specification attachments.

It is still another object of this invention to provide a method of attaching pipes which provides 100% penetration in the attachment weld. Design steps enabling the accomplishment of this object include varying the welding power to compensate for varying weld prep depth while automatically welding tube(s) to a header. An advantage associated with the realization of this object is a higher quality pipe to pipe attachment.

It is yet another object of the present invention to provide a method of attaching pipes which permits both an interior and an exterior weld. Design steps allowing this object to be accomplished include longitudinally dividing a header into two parts, making header bores into one header part, inserting a tube into each header bore, automatically welding each tube into its respective header bore from the inside of the header part by means of automatic welding, and finally making a weld exterior to the header. A benefit associated with the accomplishment of this object is a stronger, higher quality weld to attach two pipes.

BRIEF DESCRIPTION OF THE DRAWINGS

The invention, together with the other objects, features, aspects and advantages thereof will be more clearly understood from the following in conjunction with the accompanying drawings.

Four sheets of drawings are provided. Sheet one contains FIGS. 1 and 2. Sheet two contains FIGS. 3 and 4. Sheet three contains FIGS. 5 and 6. Sheet four contains FIGS. 7–9.

DETAILED DESCRIPTION OF THE PREFERRED EMBODIMENT

Figure 1:
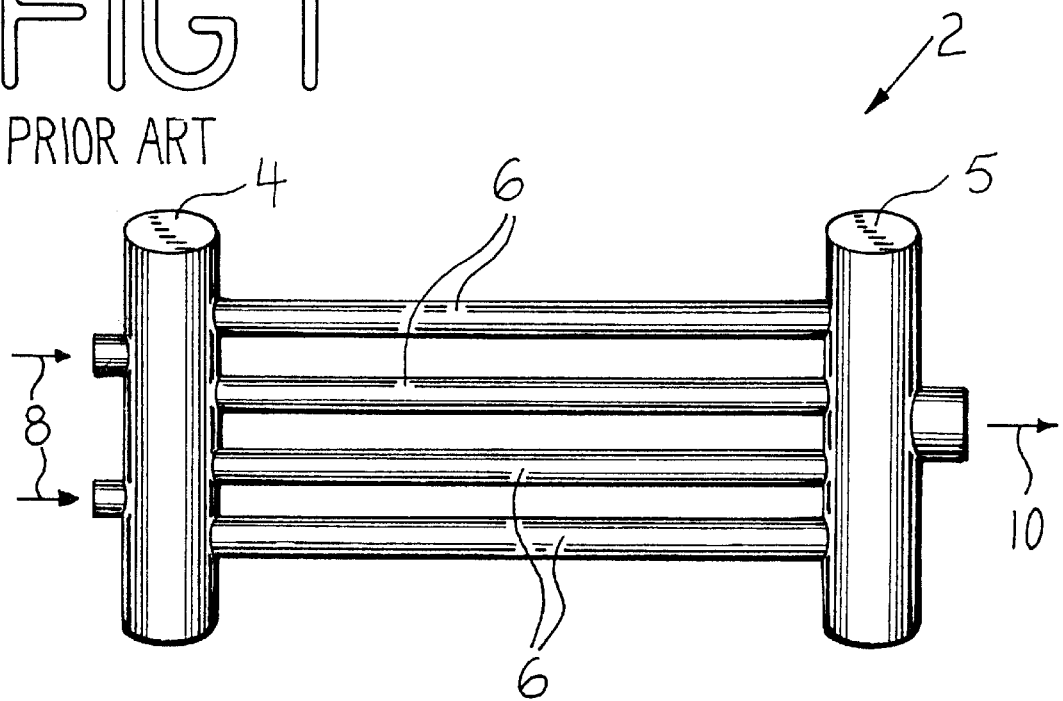
FIG. 1 is a front isometric view of typical prior art heat recovery steam generator 2.
Figure 2:
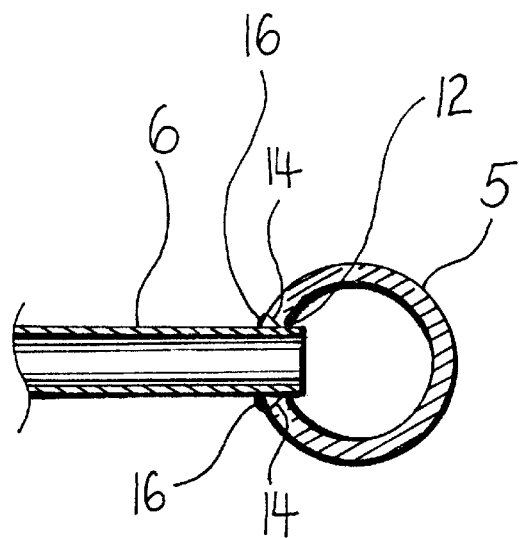
FIG. 2 is a front isometric view of a conventional attachment between finned tube 6 and second header 5.

FIGS. 3–9 depict the instant method of attaching pipes. The method is especially useful when attaching a plurality of smaller diameter pipes to a larger diameter pipe, such as attaching the various finned tubes 6 to the headers 4, 5 as depicted in FIG. 1. For the purpose of convenience, the larger diameter pipe in FIGS. 3–9 will be referred to as header 20, and the smaller diameter pipe(s) being attached to header 20 will be referred to as tube(s) 32. This nomenclature should not be misconstrued to mean the instant method is only applicable to the connection of finned tubes to headers; to the contrary, the instant method is envisioned as encompassing any attachment of two pipes, in any art. It is contemplated that any method of attachment may be used, including but not limited to welding, swaging, expanding, beading, any combination thereof, etc.

Figure 3:
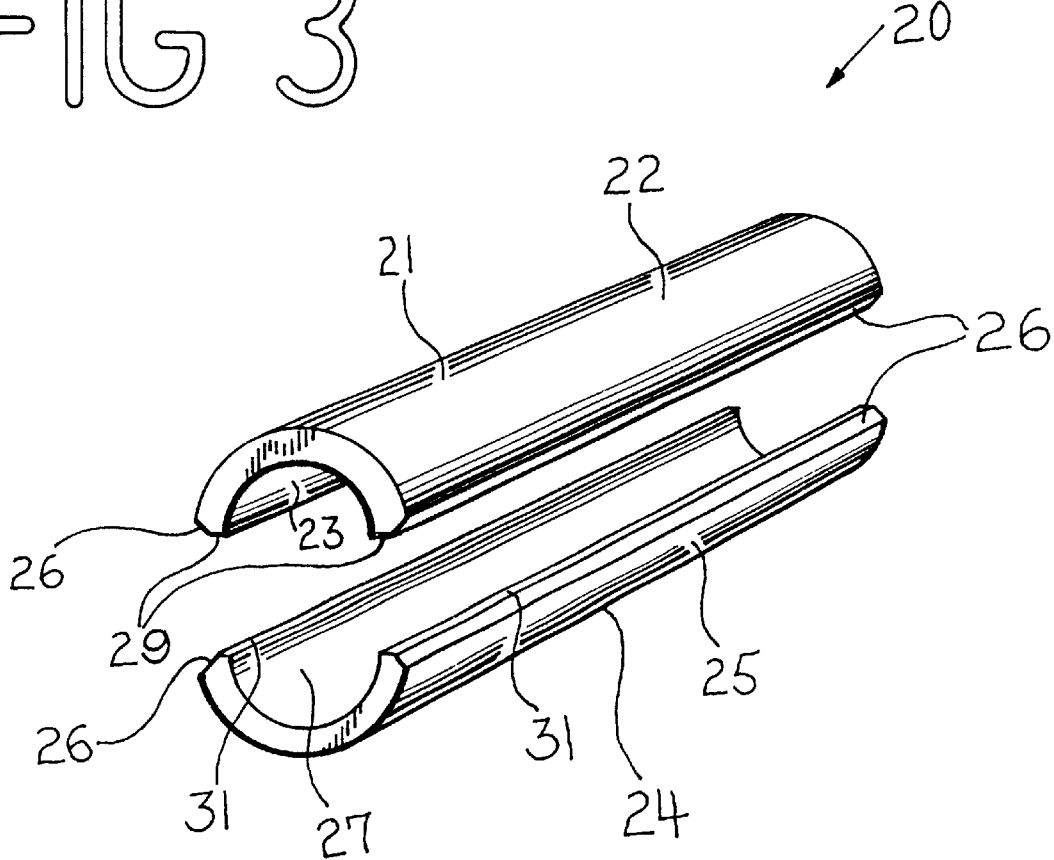
FIG. 3 is a front quarter isometric view of header 20 which has been longitudinally cut into header first part 22 and header second part 24, and header longitudinal weld preps 26 have been cut into each header part.

FIG. 3 depicts the first step of the instant method of attaching pipes, wherein header 20 is separated longitudinally into header first part 22 and header second part 24. Header first part 22 comprises two header first part cut faces 29, header first part outside surface 21, and header first part inside surface 23. Header second part 24 comprises two header second part cut faces 31, header second part outside surface 25, and header second part inside surface 27. If the method of subsequent re-attachment of header first part 22 to header second part 24 is to be a weld, simultaneously with cutting header 20 into header first part 22 and header second part 24 a header longitudinal weld prep 26 may be cut into both intersections of header first part outside surface 21 with the corresponding header first part cut face 29, and into both intersections of header second part outside surface 25 with the corresponding header second part cut face 31. In a subsequent step, header longitudinal welds 36 at longitudinal weld preps 26 may be used to re-attach header first part 22 to header second part 24.

Figure 4:
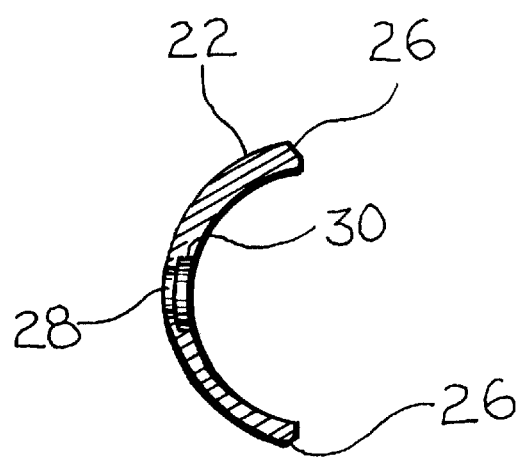
FIG. 4 is an axial cross-sectional view of header first part 22 with header bore 28, and header tube weld prep 30 cut into header first part 22.

The second step of the instant method of attaching pipes is depicted in FIG. 4, and consists of making header bore(s) 28 in header first part 22. Each header bore 28 is sized to admit one tube 32. Where the method of attachment used to attach tube 32 to header first part 22 will be welding, header tube weld prep 30 may be simultaneously cut into the intersection of each header bore 28 with header first part inside surface 23.

Figure 5:
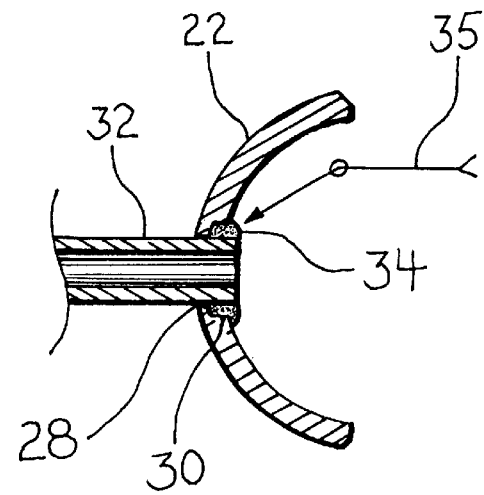
FIG. 5 is an axial cross-sectional view of header first part 22 with an extreme of tube 32 inserted into header bore 28, and pipe to pipe weld 34 at header tube weld prep 30 attaching tube 32 to header first part 22.

The third step of the instant method is depicted in FIG. 5, and comprises the step of inserting one extreme of tube 32 into each header bore 28, and attaching each tube 32 to header first part 22. In FIG. 5 the method of attachment depicted is by means of pipe to pipe weld 34, as indicated by weld arrow 35. Note that pipe to pipe welds 34 may be performed automatically, several at a time. In the preferred embodiment, five (5) or more pipe to pipe welds 34 were performed simultaneously, thus greatly reducing the time required to perform these welds. In addition, power was adjusted automatically over the course of the pipe to pipe welds 34, in order to achieve 100% penetration, a dramatic improvement over the currently practiced manual, one weld at a time method.

The fourth step of the instant method of attaching pipes comprises inspection of the attachment. A major advance inherent in the instant method is the ability to inspect both the attachment at the intersection of header bore 28 with header first part inside surface 23, and the attachment at the intersection of header bore 28 with header first part outside surface 21 (the conventional attachment method only permits inspection of the attachment at the intersection of header bore 28 with header first part outside surface 21).

Figure 6:
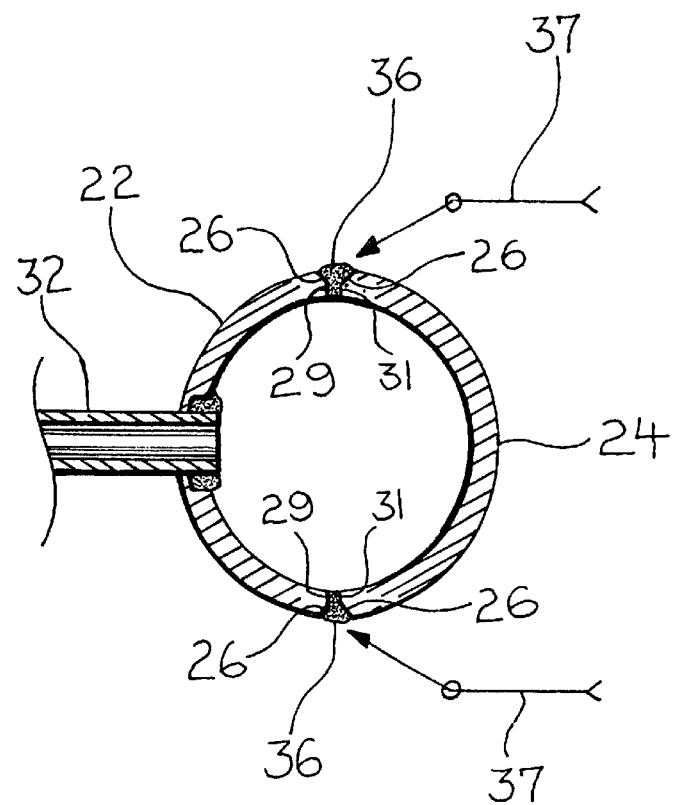
FIG. 6 is an axial cross-sectional view of tube 32 attached to header first part 22, and header longitudinal welds 36 attaching header first part 22 to header second part 24 at header longitudinal weld preps 26.

The fifth step of the instant method of attaching pipes comprises the step of juxtapositioning each header first part cut face 29 with a corresponding header second part cut face 31, and re-attaching header first part 22 to header second part 24. Various means of re-attaching header first part 22 and header second part 24 may be employed, such as welding, soldering, chemical or mechanical adhesives or cement, flanges with fasteners, etc. FIG. 6 depicts one such attachment. In FIG. 6, header first part 22 has been re-attached to header second part 24 by means of header longitudinal weld 36 as indicated by weld arrows 37.

Figure 7:
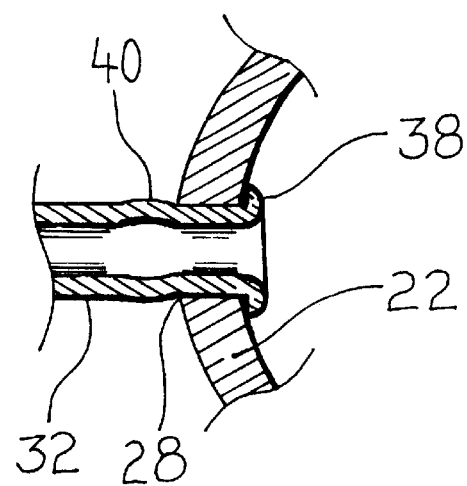
FIG. 7 is an axial cross-sectional view of tube 32 attached to header first part 22 by means of expansion 40 and bead 38.
Figure 8:
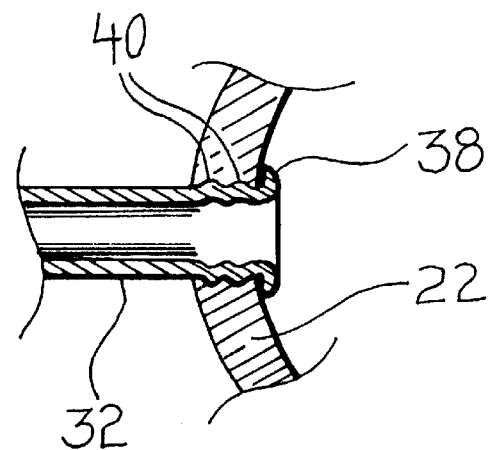
FIG. 8 is an axial cross-sectional view of tube 32 attached to header first part 22 by means of expansions 40 and bead 38.
Figure 9:
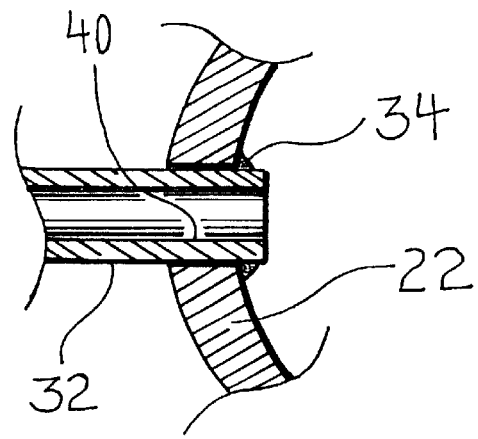
FIG. 9 is an axial cross-sectional view of tube 32 attached to header first part 22 by means of expansion 40 and pipe to pipe weld 34.

FIGS. 7–9 depict some of the many alternate methods of attaching tube 32 to header first part 22. FIG. 7 is an axial cross-sectional view of tube 32 attached to header first part 22 by means of expansion 40 and bead 38. FIG. 8 is an axial cross-sectional view of tube 32 attached to header first part 22 by means of expansions 40. FIG. 9 is an axial cross-sectional view of tube 32 attached to header first part 22 by means of expansion 40 and pipe to pipe weld 34.

While a preferred embodiment of the invention has been illustrated herein, it is to be understood that changes and variations may be made by those skilled in the art without departing from the spirit of the appending claims.

DRAWING ITEM INDEX 2 heat recovery steam generator
4 first header
5 second header
6 finned tube
8 arrow
10 arrow
12 bore
14 weld prep
16 weld
20 header
21 header first part outside surface
22 header first part
23 header first part inside surface
24 header second part
25 header second part outside surface
26 header longitudinal weld prep
27 header second part inside surface
28 header bore
29 header first part cut face
30 header tube weld prep
31 header second part cut face
32 tube
34 pipe to pipe weld 35 weld arrow
36 header longitudinal weld
37 weld arrow
38 bead
40 expansion

I claim:

1. A method of attaching pipes, said pipes comprising a header and at least one tube, said method comprising the steps of:
   A. Cutting said header longitudinally into a header first part and a header second part, said header first part comprising a header first part inside surface, a header first part outside surface, and a pair of header first part cut faces; said header second part comprising a header second part inside surface, a header second part outside surface, and a pair of header second part cut faces;
   B. Making one header bore into said header first part for each tube to be attached to said header;
   C. Placing one extreme of each said tube into a corresponding said header bore;
   D. Permanently attaching each said tube to said header first part;
   E. Inspecting the attachment between each said tube and said header first part both at said header first part inside surface and at said header first part outside surface;
   F. Juxtaposing each said header first part cut face with a corresponding header second part cut face; and
   G. Re-attaching said header first part to said header second part.

2. The method of claim 1 comprising the further steps of:
   B1. Making a header tube weld prep at an intersection of each said header bore and said header first part inside surface; and
   D1. Making a pipe to pipe automatic weld at an intersection of each said header tube weld prep and a corresponding said header tube.

3. The method of claim 1 comprising the further step of attaching each said tube to said header by means of a bead formed at an intersection of each said tube and said header first part inside surface.

4. The method of claim 3 comprising the further step of forming an expansion in each said tube at an intersection of each said tube and said header first part outside surface.

5. The method of claim 3 comprising the further step of forming at least one expansion in each said tube between said header first part outside surface and said header first part inside surface.

6. The method of claim 1 comprising the further step of attaching each said tube to said header by means of at least one expansion in each said tube between said header first part outside surface and said header first part inside surface.

7. The method of claim 6 comprising the further step of automatically welding each said tube to said header at an intersection of said tube and said header first part inside surface.

8. The method of claim 3 comprising the further step of welding each said tube to said header at an intersection of said bead and said header first part inside surface.

9. The method of claim 1 comprising the further steps of:
   A1. Making a header longitudinal weld prep at each intersection of said header first part outside surface with each said header first part cut face, and a header longitudinal weld prep at each intersection of said header second part outside surface with each said header second part cut face; and
   G1. Making a header longitudinal weld at each said pair of juxtaposed header longitudinal weld preps.

10. The method of claim 9 comprising the further step of:
    H. Inspecting each said header longitudinal weld.

11. The method of claim 1 comprising the further steps of:
    D2. Making a pipe to pipe weld at an intersection of each said header tube and a corresponding said header first part outside surface.

* * * * *